United States Patent
Suefuji

(10) Patent No.: US 11,522,474 B2
(45) Date of Patent: Dec. 6, 2022

(54) VIBRATION WAVE MOTOR AND ELECTRONIC APPARATUS INCLUDING THE VIBRATION WAVE MOTOR

(71) Applicant: CANON KABUSHIKI KAISHA, Tokyo (JP)

(72) Inventor: Kei Suefuji, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 328 days.

(21) Appl. No.: 16/688,248

(22) Filed: Nov. 19, 2019

(65) Prior Publication Data

US 2020/0177107 A1  Jun. 4, 2020

(30) Foreign Application Priority Data

Nov. 30, 2018 (JP) .............. JP2018-225865

(51) Int. Cl.
*H02N 2/14* (2006.01)
*H02N 2/10* (2006.01)

(52) U.S. Cl.
CPC ............. *H02N 2/142* (2013.01); *H02N 2/103* (2013.01)

(58) Field of Classification Search
CPC ........ H02N 2/142; H02N 2/103; H02P 25/00; H02P 25/02; H02P 25/022; H02P 25/032; H02P 25/062; H02P 25/034; H02P 25/086; H02P 25/10; H02P 25/102; H02P 1/00; H02P 1/24; H02P 1/26; H02P 1/42; H02P 1/46; H02P 1/465; H02P 4/00; H02P 5/00; H02P 6/00; H02P 7/00; H02P 8/00; H02P 21/00; H02P 21/30; H02P 23/00; H02P 23/04; H02P 23/07; H02P 27/00; H02P 2207/05

See application file for complete search history.

(56) References Cited

U.S. PATENT DOCUMENTS

| | | | |
|---|---|---|---|
| 7,466,062 B2 * | 12/2008 | Sakatani | H02N 2/006 310/323.01 |
| 10,439,518 B2 | 10/2019 | Suefuji et al. | |
| 2014/0249369 A1 * | 9/2014 | Hanabusa | A61B 1/045 600/109 |
| 2018/0183358 A1 | 6/2018 | Mori | |

FOREIGN PATENT DOCUMENTS

| | | |
|---|---|---|
| JP | 2016-010254 A | 1/2016 |
| JP | 2017-070115 A | 4/2017 |
| JP | 2018-108016 A | 7/2018 |
| JP | 2018-185005 A | 11/2018 |

OTHER PUBLICATIONS

Office Action dated Jul. 14, 2022, in Japanese Patent Application No. 2018-225865.

* cited by examiner

*Primary Examiner* — Antony M Paul
(74) *Attorney, Agent, or Firm* — Venable LLP

(57) ABSTRACT

A vibration wave motor includes a vibrator, a contact body to be brought into contact with the vibrator, a shaft fixed to the contact body, and a fixing member configured to fix the contact body and the shaft from the shaft side.

9 Claims, 10 Drawing Sheets

PRIOR ART

VIBRATION WAVE MOTOR AND ELECTRONIC APPARATUS INCLUDING THE VIBRATION WAVE MOTOR

BACKGROUND OF THE INVENTION

Field of the Invention

The present disclosure relates to a vibration wave motor and an electronic apparatus including the vibration wave motor.

DESCRIPTION OF THE RELATED ART

In general, a vibration wave motor includes a vibrator and a contact body. The vibrator generates traveling vibration waves (hereinafter, simply referred to as "traveling waves"). The contact body is brought into (pressure or pressing) contact with the vibrator. Through the traveling waves, the vibrator and the contact body are frictionally driven (that is a method of transmitting power through use of a frictional force caused by contact), thereby obtaining a driving force. Thus, the vibration wave motor has a simple and thin structure, and can perform driving quietly with high accuracy. Accordingly, the vibration wave motor is used as a motor for use in, for example, a turning drive apparatus such as a pan head apparatus, a production apparatus in factory automation (FA), or office automation equipment (see Japanese Patent Application Laid-Open No. 2016-10254). One example of the vibration wave motor of this type is illustrated in FIG. 10.

In FIG. 10, a vibrator 902 fixed to a base 901 has an annular shape, and a plurality of protrusions 902f are formed on an upper portion of an elastic body 902b along an entire periphery of the vibrator 902. Piezoelectric ceramics ceramic 902a is bonded to a bottom surface of the elastic body 902b with an adhesive. When the motor performs driving, two AC voltages having a phase difference are applied by a driving circuit (not shown), thereby generating the traveling waves.

In a contact body having components 903, 904, and 905, the contact member 903 includes a body portion 903a, a support portion 903b, and a contact portion 903c. The body portion 903a is formed of an elastic member and has an annular shape. The contact portion 903c has a friction surface to be brought into friction contact with the protrusions 902f of the vibrator 902. The support portion 903b and the contact portion 903c each have such a thickness as to be elastic, and can be stably brought into contact with the vibrator 902.

A pressurizing spring (pressurizing member) 905b is mounted to an upper surface of the contact member 903 through intermediation of a vibration damping member 904 and a pressurizing spring rubber (elastic member) 905c. The vibration damping member 904 includes a vibration damping rubber 904a and a spring receiving member 904b having an annular shape. With this configuration, unnecessary vibration generated on the contact member 903 is prevented, and generation of noise and reduction in efficiency are suppressed.

An inner peripheral portion of the pressurizing spring 905b is mounted to a spring regulating member 905a fixed to an output unit (shaft) 908, and the pressurizing spring 905b transmits a driving force of the contact member 903 to the shaft 908. The shaft 908 is supported by two rolling bearings 49a and 49b so as to be rotatable about its axis. A fixing screw (fixing member) 907 is threadedly engaged with the spring regulating member 905a.

The spring regulating member 905a is fixed to the shaft 908 with the fixing member 907 at a position in an axial direction of the shaft at which there is obtained a displacement amount of the pressurizing spring 905b required to hold the contact member 903 in pressure contact with the vibrator 902 by an appropriate force. With this configuration, the driving can be transmitted without involving backlash in a rotating direction of the shaft. Thus, high-accuracy driving of the vibration wave motor can be realized.

However, the vibration wave motor of the related art as illustrated in FIG. 10 has the following problems.

That is, the spring regulating member 905a is fixed to the shaft 908 in such a manner that the fixing screw (fixing member) 907 is threadedly engaged from an outer diameter of the spring regulating member 905a toward the output shaft (shaft) 908. Accordingly, the spring regulating member 905a has a female thread portion with which the fixing member 907 is threadedly engaged.

Therefore, an axial size of the spring regulating member 905a is increased by a diameter of the female thread corresponding to a diameter of the fixing member 907 and by a thickness required to form the female thread in the spring regulating member 905a. As a result, there arises a problem in that the vibration wave motor is increased in size, particularly, the output shaft (shaft) is increased in length. In particular, when a pressurizing force of the pressurizing spring 905b is increased along with an increase in torque of the vibration wave motor, a shaft retaining force corresponding to the pressurizing force is required, which leads to use the large fixing member 907. Thus, there arises a problem in that the vibration wave motor is further increased in size.

SUMMARY OF THE INVENTION

In view of the above-mentioned problems, it is an object of the present disclosure to provide a vibration wave motor capable of achieving downsizing of the vibration wave motor, in particular, reduction in length of a shaft.

In order to solve the above-mentioned problems, according to at least one embodiment of the present disclosure, there is provided a vibration wave motor including: a vibrator; a contact body to be brought into contact with the vibrator; a shaft fixed to the contact body; and a fixing member configured to fix the contact body and the shaft from the shaft side.

According to the present disclosure, the vibration wave motor capable of achieving the downsizing of the vibration wave motor, in particular, the reduction in length of the shaft can be provided.

Further features of the present invention will become apparent from the following description of exemplary embodiments with reference to the attached drawings.

DESCRIPTION OF THE EMBODIMENTS

Embodiments will now be described in detail in accordance with the accompanying drawings.

First Embodiment

Figure 1:
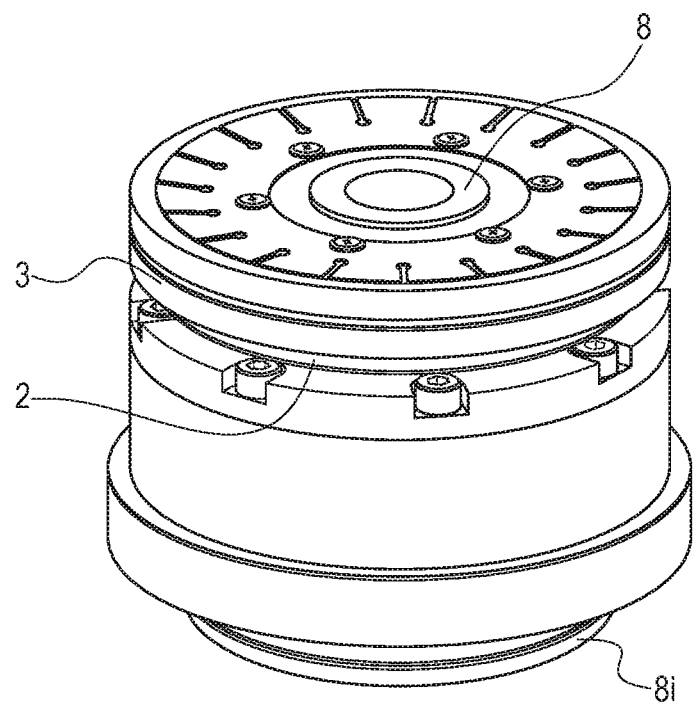
FIG. 1 is a perspective view for illustrating a vibration wave motor according to a first embodiment of the present disclosure.
Figure 2:
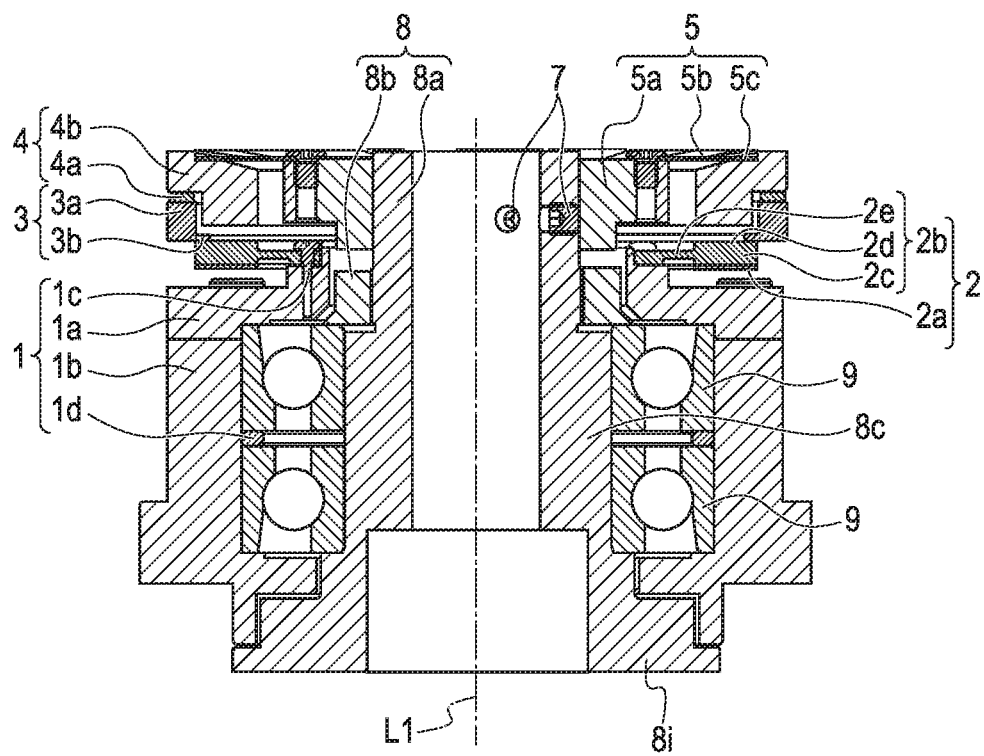
FIG. 2 is a sectional view for illustrating the vibration wave motor according to the first embodiment.
Figure 3:
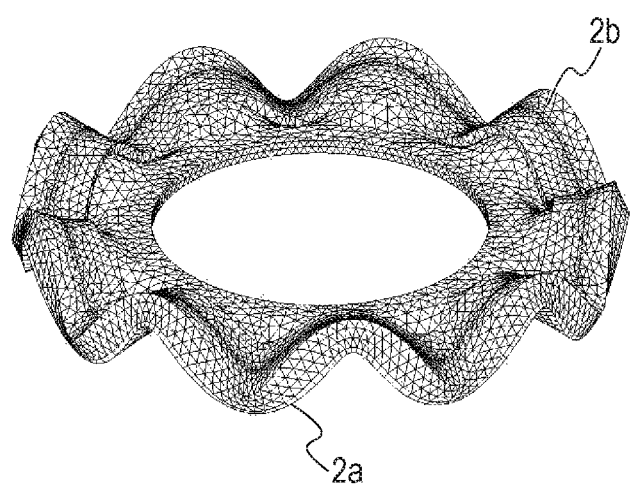
FIG. 3 is a perspective view for illustrating a vibration mode excited on a vibrator of the vibration wave motor according to the first embodiment.

With reference to FIG. 1, FIG. 2, and FIG. 3, description is made of a configuration example of a vibration wave motor of a rotary type according to a first embodiment of the present disclosure.

FIG. 1 is a perspective view for illustrating the vibration wave motor according to the first embodiment. As illustrated in FIG. 1 (perspective view), the vibration wave motor according to the first embodiment is formed into an annular shape, and an output extraction portion 8i forming an output unit (shaft) 8 is coupled to a target to be driven (member to be driven) (not shown), to thereby cause the member to be driven in a rotary motion.

FIG. 2 is a sectional view for illustrating the vibration wave motor illustrated in FIG. 1 (perspective view). A center axis L1 corresponds to a rotation center axis of the vibration wave motor. FIG. 3 is a perspective view for illustrating a vibration mode excited on a vibrator of the vibration wave motor illustrated in FIG. 1 (perspective view).

In FIG. 2, a vibrator 2 includes a piezoelectric element 2a and an elastic body 2b. The piezoelectric element 2a is an electro-mechanical energy conversion element configured to convert an electric amount into a mechanical amount. The elastic body 2b is coupled to the piezoelectric element 2a. A driving voltage (AC voltage) is applied to the piezoelectric element 2a so as to cause the vibrator 2 to make an elliptic motion by a traveling wave through use of a well-known technology. Thus, a contact body, which includes a contact member 3, a spring receiving member 4, and a pressurizing member 5, and is brought into contact with the vibrator 2, and the vibrator 2 are frictionally driven, thereby obtaining a driving force (moving the contact body and the vibrator 2 relatively to each other).

In the first embodiment, as illustrated in FIG. 3, the contact member 3 is driven with out-of-plane ninth-order vibration bending in a direction of the center axis L1 (see FIG. 2) and having ninth-order components in a rotating direction. In FIG. 3, for ease of understanding, a displacement amount is illustrated with emphasis.

In FIG. 2, the elastic body 2b includes a base 2c, and a flange portion 2e that extends from the base 2c and is configured to fix the elastic body 2b to a housing 1. The flange portion 2e is fastened to a base member 1a of the housing 1 with a fixing screw 1c. The base member 1a is formed into an annular shape. A surface of the base 2c on the contact member 3 side corresponds to a sliding surface 2d brought into slide contact with the contact member 3. The elastic body 2b is an elastic member made of metal. In the first embodiment, the elastic body 2b is made of stainless steel. Moreover, as hardening treatment for increasing durability, nitriding treatment is performed on the sliding surface 2d brought into slide contact with the contact member 3.

In FIG. 2, the contact member (or the contact body or another part of the contact body) 3 includes a body portion 3a and a contact portion 3b. The body portion 3a is formed of an elastic member and has an annular shape. The contact portion 3b has a sliding surface brought into friction contact with the vibrator 2. In the first embodiment, the contact member 3 is made of stainless steel subjected to quenching treatment. The contact portion 3b has such a thickness as to be elastic, and can be stably brought into contact with the vibrator 2.

The spring receiving member (or the contact body or another part of the contact body) 4 and the pressurizing member (or the contact body or a part of the contact body) 5 are mounted to an upper surface of the contact member 3. The spring receiving member (or the contact body or another part of the contact body) 4 includes a vibration damping rubber 4a being a vibration damping member, and a weight member 4b.

The vibration damping rubber 4a has an annular shape, and is made of, for example, butyl rubber or silicone rubber having high vibration damping performance. The weight member 4b is formed of an annular elastic member, and is made of brass in the first embodiment. The vibration damping rubber 4a and the weight member 4b suppress unnecessary vibration of the contact member 3 generated during driving of the vibration wave motor, thereby preventing noise and reduction in output of the vibration wave motor.

The pressurizing member (or the contact body or a part of the contact body) 5 includes a spring regulating member 5a, a pressurizing spring 5b, and a pressurizing spring rubber (elastic member) 5c.

The pressurizing spring 5b is formed of a leaf spring having a radial shape, and has a thickness capable of sufficiently ensuring displacement within a range in which proof stress is not overcome by a pressurizing force. Accordingly, as compared to, for example, a leaf spring having a disc shape, large displacement can be achieved so that a change in the pressurizing force due to aged deterioration such as abrasion of the vibrator 2 and the contact member 3 becomes smaller.

The pressurizing spring 5b is mounted to the spring regulating member 5a that has an annular shape and is fixed to the shaft 8 with fixing screws (fixing members) 7 (described later). With this configuration, the driving force of the contact member 3 obtained by vibration of the vibrator 2 is transmitted to the shaft 8. Further, in this manner, the contact body including the contact member 3, the spring receiving member 4, and the pressurizing member 5, is rotated in a circumferential direction of the shaft 8, and the shaft 8 is rotated about its axis.

Further, the pressurizing spring 5b is received in a second recessed portion 4c so as to be brought into contact with a bottom surface of the recessed portion (second recessed portion 4c, see FIG. 4) formed in the weight member 4b. With this configuration, projection of the pressurizing spring 5b in an axial direction along the center axis L1 of the shaft 8 (hereinafter, also referred to as "axial direction of the shaft 8" or "axial direction"), is suppressed, thereby being capable of reducing the length of the shaft 8.

The pressurizing member 5, which is a part of the contact body, is fixed directly to the shaft with the fixing members 7 at, of a position in the circumferential direction of the shaft 8 and a position in the axial direction of the shaft 8, both the position in the circumferential direction of the shaft 8 and the position in the axial direction of the shaft 8.

Further, the contact member 3 and the spring receiving member 4, each being another part of the contact body, are fixed indirectly to the shaft with the fixing members 7 at, of a position in the circumferential direction of the shaft 8 and a position in the axial direction of the shaft 8, only the position in the circumferential direction of the shaft 8. Here, "fixed indirectly" means "fixed through intermediation of another member". In the first embodiment, the contact member 3 and the spring receiving member 4 are fixed through intermediation of the pressurizing member 5 as described above.

In the first embodiment, the pressurizing spring 5b and the spring regulating member 5a are fastened to each other with a screw, but may be fixed to each other through, for example, adhesion. Further, as long as the pressurizing spring 5b and the spring regulating member 5a have a rotatable and transmittable configuration, the pressurizing spring 5b and the spring regulating member 5a may simply be brought into abutment against each other. In any case, an abutment portion between the spring regulating member 5a and the pressurizing spring 5b is integrally movable in the axial direction.

The pressurizing member 5 (pressurizing spring 5b) is brought into contact with the bottom surface of the second recessed portion 4c (see FIG. 4) through intermediation of the elastic member 5c. The elastic member 5c is made of, for example, butyl rubber or chloroprene rubber. Elastic deformation of the elastic member 5c mitigates an influence of flatness of the surface of the weight member 4b on which the elastic member 5c is provided. Accordingly, the pressurizing force is uniformly applied from the pressurizing spring 5b, which is brought into abutment against the elastic member 5c in the axial direction, to the contact member 3 in the rotating direction, thereby keeping stable contact between the vibrator 2 and the contact member 3.

The shaft 8 includes an output shaft 8a and a bearing pressure member 8b. The output shaft 8a includes a bearing mounting portion 8c. The bearing pressure member 8b includes an inner peripheral portion to be threadedly engaged with the output shaft 8a.

The output shaft 8a is formed into a hollow shape. The shaft 8 is supported by two rolling bearings 9 so as to be rotatable about the center axis L1 as the rotation center axis. The rolling bearings 9 each include an inner ring to be fitted to an outer peripheral portion of the bearing mounting portion 8c. In the first embodiment, the rolling bearings 9 are formed of angular contact ball bearings.

Outer rings of the rolling bearings 9 are fitted to the base member 1a and a holder member 1b of the housing 1, and are fixed to the housing 1. A spacer 1d is provided between the two rolling bearings 9.

Pre-load is applied to the inner rings of the rolling bearings 9 by threadedly engaging the bearing pressure member 8b with the output shaft 8a under appropriate fastening torque. With this configuration, backlash of the rolling bearings 9 in a radial direction is suppressed, thereby being capable of suppressing vibration of the output shaft 8a in the radial direction.

Figure 4:
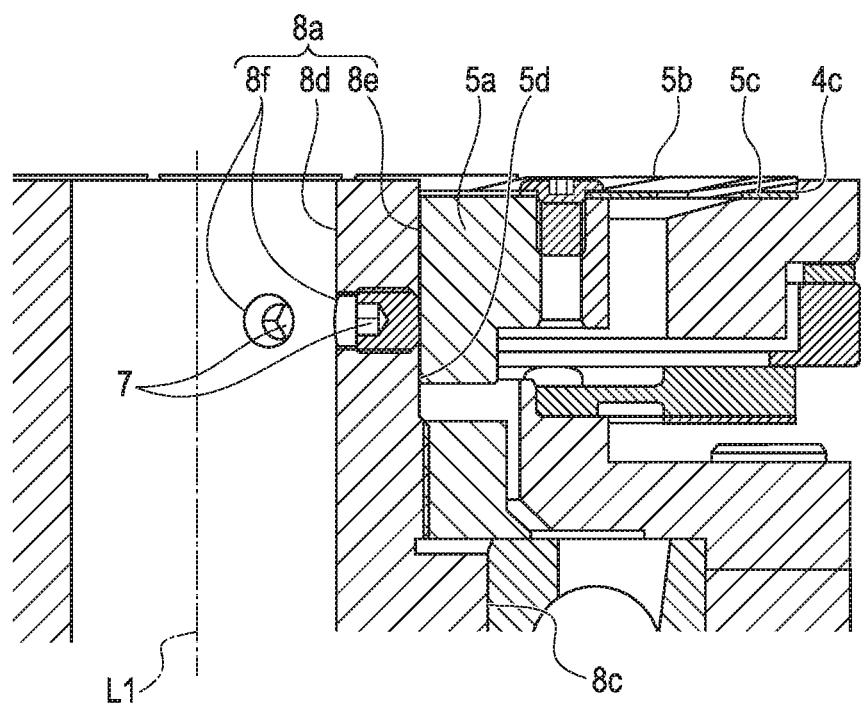
FIG. 4 is a partially enlarged sectional view for illustrating a part of the vibration wave motor according to the first embodiment.

FIG. 4 is an enlarged sectional view for illustrating the vibration wave motor illustrated in FIG. 2 (sectional view).

In FIG. 4, the output shaft 8a includes a hollow inner peripheral portion 8d, a shaft outer periphery fixing portion 8e, and two female thread portions 8f.

The shaft outer periphery fixing portion 8e is brought into abutment against a regulating-member inner peripheral portion 5d of the spring regulating member 5a of the pressurizing member 5. In the first embodiment, the shaft outer periphery fixing portion 8e and the regulating-member inner peripheral portion 5d are formed to have dimensional tolerance in the radial direction so that the shaft outer periphery fixing portion 8e and the regulating-member inner peripheral portion 5d are brought into abutment against each other in a so-called clearance fit relationship. Accordingly, at the time of assembly of the vibration wave motor, the spring regulating member 5a can be easily inserted into the output shaft 8a. Further, a position of the spring regulating member 5a in the radial direction is regulated by the output shaft 8a, thereby being capable of keeping misalignment in the radial direction between the center axis of the contact member 3 and the center axis L1 of the shaft 8 within a permissible range.

The relationship of tolerance in the radial direction is not limited to the clearance fit, and it is only required that a fitting relationship is established in consideration of ease of assembly and driving performance. Further, when a radial clearance between the output shaft 8a and the spring regulating member 5a is increased, the backlash is removed by the clearance in a threadedly-engaging direction when the fixing members 7 are threadedly engaged. However, owing to deformation of the elastic member 5c, the influence on the contact member 3 can be mitigated.

The two female thread portions 8f are formed with an interval of 60 degrees in the rotating direction of the output shaft 8a, and the fixing members 7 are respectively and threadedly engaged with the two female thread portions 8f. The angle between the two female thread portions 8f is not limited to 60 degrees, and a freely-selected angle, for example, 45 degrees or 30 degrees, may be adopted. Further, the number of the female thread portions 8f is not limited to two, and may be increased or reduced in accordance with the pressurizing force and transmission torque.

The fixing member 7 is a hexagon socket head fixing screw having a flat and pointed tip, and is threadedly engaged from the hollow inner peripheral portion 8d of the output shaft 8a (from an inner side of the shaft 8 (from the shaft 8 side)) toward the shaft outer periphery fixing portion 8e. That is, the fixing member 7 is threadedly engaged from an inner peripheral surface of the hollow portion of the output shaft 8a (from the hollow portion side) to an outer peripheral surface thereof (the fixing member 7 fixes the contact body including the contact member 3, the spring receiving member 4, and the pressurizing member 5, and the shaft 8 from the inner side of the shaft 8 (from the shaft 8 side)).

Further, the tip of the fixing member 7 is brought into abutment against the regulating-member inner peripheral portion 5d of the spring regulating member 5a, and the fixing member 7 fixes the position of the spring regulating member 5a in the axial direction. The position of the spring regulating member 5a in the axial direction is set to obtain such a deformation amount of the pressurizing spring 5*b* as to allow the pressurizing force of the vibration wave motor to have a desired value.

By a shaft retaining force of the two fixing members 7, the driving force of the contact member 3 is transmitted to the output shaft 8*a*. Thus, high-accuracy driving of the vibration wave motor can be realized without involving, for example, backlash.

The fixing member 7 is threadedly engaged through use of a fastening tool inserted in the hollow portion of the output shaft 8*a*. Accordingly, the fixing member 7 can be provided in a freely-selected axial range of the hollow portion of the output shaft 8*a*. In the axial direction along the center axis L1, the fixing member 7 in the first embodiment is positioned on the vibrator 2 side with respect to the upper surface of the pressurizing member 5 in FIG. 4 (end surface of the pressurizing spring 5*b*). That is, the fixing member 7 is positioned in the axial direction between the bottom surface of the vibrator 2 and the upper surface of the pressurizing member 5 (end surface of the pressurizing spring 5*b*).

With this configuration, while suppressing increase in size of the vibration wave motor in the axial direction, the spring regulating member 5*a* can be fixed to the output shaft 8*a* with the fixing members 7. Accordingly, in the related-art structure, there is a problem in that the vibration wave motor is increased in size in the axial direction by a disk in which the fixing screw (fixing member) is provided. However, as in the first embodiment, when adopting the structure in which the fixing members 7 are threadedly engaged from a radially inner portion of the hollow portion of the output shaft 8*a* (from the hollow portion side), reduction in thickness of the vibration wave motor can be realized.

Further, a length of the fixing member 7 is smaller than a radial thickness of the hollow portion of the output shaft 8*a*, that is, a distance between the hollow inner peripheral portion 8*d* and the shaft outer periphery fixing portion 8*e*. The fixing member 7 is prevented from projecting from the hollow inner peripheral portion 8*d* toward the inner diameter side when the fixing member 7 is threadedly engaged.

Accordingly, when electric wiring or air piping for supplying a drive source to the member to be driven by the vibration wave motor is arranged in a hollow region of the shaft, or when, for example, a sensor signal line from the member to be driven is arranged, the fixing member 7 is not brought into contact with the wiring or the piping during driving. Further, damage of the wiring or the piping can be prevented.

Further, in the related-art structure, it is required to increase a diameter of the disk also in the radial direction by a screw length of the fixing screw (fixing member). When a sensor or a cable is arranged on top of the vibration wave motor, it has been required to arrange the sensor or the cable while avoiding a region corresponding to the size of the disk.

In contrast, in the first embodiment, the fixing members 7 are provided in the output shaft 8*a*, and hence there is a space above the vibration wave motor. Thus, the sensor or the cable can be arranged easily.

Further, in the first embodiment, when the fixing member 7 is threadedly engaged, the position of the pressurizing member 5 in the axial direction can be adjusted and fixed while measuring a reaction force against pressure of the pressurizing member 5. Thus, output fluctuation caused by fluctuation of the pressurizing force of the vibration wave motor can be suppressed. Further, as compared to fixation through shrinkage fit, an assembling device is simpler, and assembling steps are reduced, thereby being capable of improving productivity.

Moreover, for example, when resetting is performed through readjustment in production or the contact member 3 is replaced for maintenance after long-term drive, pressure can be cancelled by simply releasing threaded engagement of the fixing member 7. Accordingly, maintenance is facilitated as compared to a case of the shrinkage fit requiring a dedicated cancelling tool.

In the first embodiment, drive vibration of the vibrator is the out-of-plane ninth-order vibration, but is not limited thereto. The order and the bending direction can be selected as appropriate.

Incidentally, in the first embodiment, the spring regulating member 5*a* is fixed to the output shaft 8*a* of the shaft 8 with only the fixing members 7, but the present disclosure is not limited to this configuration. Next, description is made of modification examples of the shaft 8 and the spring regulating member 5*a*.

Figure 5:
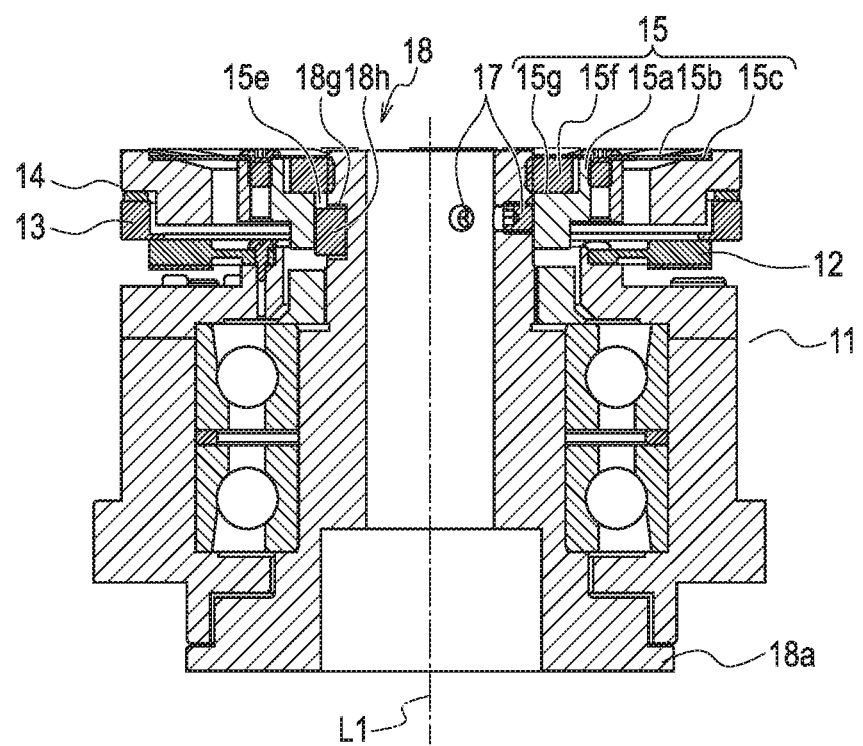
FIG. 5 is a sectional view for illustrating a vibration wave motor according to a modification example of the first embodiment.

FIG. 5 is a sectional view for illustrating a vibration wave motor according to a first modification example of the first embodiment. A housing 11 is provided. A pressurizing member 15 includes a spring regulating member 15*a*, a pressurizing spring 15*b*, a pressurizing spring rubber (elastic member) 15*c*, and a retainer ring (positioning member) 15*f*. A key groove 15*e* is formed in the spring regulating member 15*a*.

In the key groove 15*e* of the spring regulating member 15*a*, a key 18*h* provided in a key groove 18*g* of a shaft 18 (output shaft 18*a*) is inserted.

The positioning member 15*f* has an annular shape, and has a female thread formed in a radially inner portion thereof. The positioning member 15*f* is threadedly engaged with the output shaft 18*a*, and is received in a first recessed portion 15*g* so that a lower surface of the positioning member 15*f* is brought into contact with an upper surface of the spring regulating member 15*a* (bottom surface of the first recessed portion 15*g*). With this configuration, projection of the positioning member 15*f* in the axial direction of the shaft 8 is suppressed, thereby being capable of reducing the length of the shaft 8.

At the time of assembly of the vibration wave motor, the positioning member 15*f* is threadedly engaged with the output shaft 18*a*, and the positioning member 15*f* is moved to a vibrator 12 side in the axial direction of the shaft 8. After the spring regulating member 15*a* is moved toward a position of obtaining a desired pressurizing force, fixing screws (fixing members) 17 are threadedly engaged to fix the spring regulating member 15*a*. The pressurizing force at the time of assembly is controlled by fastening torque for the positioning member 15*f*. In this manner, a position of the spring regulating member 15*a* in the axial direction of the shaft 18 is fixed with respect to the shaft 18.

However, the positioning member 15*f* may be threadedly engaged and assembled after the spring regulating member 15*a* is pushed by a desired pressurizing force in advance. In any case, before the fixing members 17 are threadedly engaged, the position of the spring regulating member 15*a* in the axial direction is determined. Thus, the fixing members 17 are threadedly engaged easily owing to the positioning member 15*f*, thereby being capable of improving ease of assembly of the vibration wave motor.

Further, the key 18*h* prevents the spring regulating member 15*a* from being rotated relatively to the output shaft 18*a*. Accordingly, even when the positioning member 15*f* is turned and threadedly engaged at the time of assembly, the spring regulating member 15*a* is not rotated, and can be assembled stably.

A slight clearance is defined between the key 18h and the key groove 15e of the spring regulating member 15a in the rotating direction. Similarly, a slight clearance is defined also between the key 18h and the key groove 18g of the output shaft 18a in the rotating direction. However, rotation transmission through only the key 18h is not performed, and a driving force of the contact member 13 is transmitted by a shaft retaining force of the two fixing members 17 to the output shaft 18a via a spring receiving member 14 and the pressurizing member 15. Thus, high-accuracy driving of the vibration wave motor can be realized without involving, for example, backlash.

The position of the spring regulating member 15a in the axial direction is fixed not only by the fixing members 17 but also by the positioning member 15f. Accordingly, even when a severe external force is applied to the vibration wave motor at the time of, for example, falling from a high place to loosen threaded engagement of the fixing members 17, the positioning member 15f retains the position of the spring regulating member 15a in the axial direction. As a result, a change in pressurizing force of the vibration wave motor can be suppressed. Further, rotation transmission through only the key 18h can be performed. Thus, even when the fixing members 17 are loosened as described above, rotational drive of the vibration wave motor can be performed.

Second Embodiment

As a second embodiment, a configuration example of a vibration wave motor different from that of the first embodiment is described with reference to FIG. 6. The second embodiment differs from the first embodiment in that a vibrator, a contact member, and an output unit each have the structure illustrated in FIG. 6. The other components of the second embodiment are the same as the corresponding components of the first embodiment described above. Thus, the same final letters of the reference symbols are used for corresponding components, and description of the other components is omitted.

Figure 6:
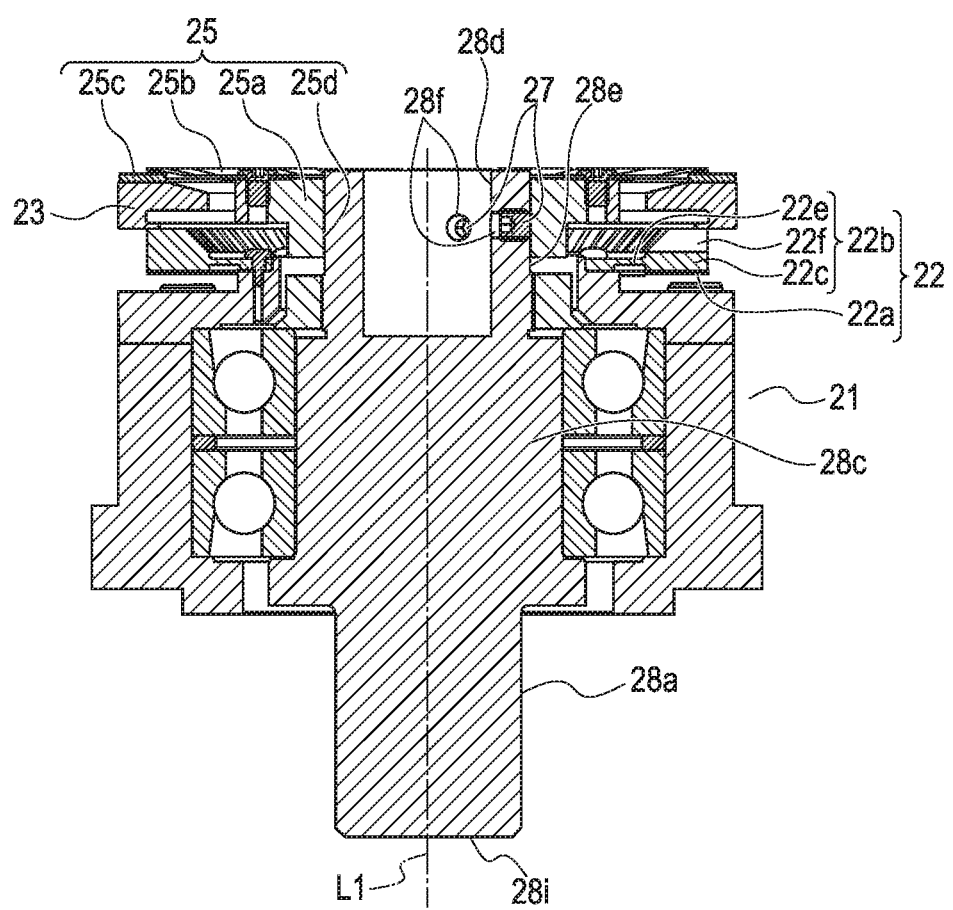
FIG. 6 is a sectional view for illustrating a vibration wave motor according to a second embodiment of the present disclosure.

In FIG. 6, a housing 21 is illustrated. A vibrator 22 includes a piezoelectric element 22a and an elastic body 22b. The elastic body 22b is coupled to the piezoelectric element 22a. The elastic body 22b of the vibrator 22 includes a base 22c, a protruding portion 22f, and a flange portion 22e. The protruding portion 22f is formed on an upper surface of the elastic body so as to protrude from the base 22c. The flange portion 22e extends from the base 22c. In the elastic body 22b, the protruding portion 22f is formed along an outer periphery of the base 22c concentrically with a center axis of the elastic body 22b.

A surface of the protruding portion 22f on a contact member 23 side, which is an upper surface of the protruding portion 22f, corresponds to a sliding surface brought into friction contact with the contact member 23. The protruding portion 22f increases an amplitude of an elliptic motion of the vibrator 22 in the rotating direction, which is caused by a traveling vibration wave generated through well-known technology, thereby being capable of rotating the contact member 23 at high speed.

A pressurizing spring rubber (elastic member) 25c is provided on an upper surface of the contact member 23. The elastic member 25c has an annular shape, and is made of, for example, butyl rubber or silicone rubber having high vibration damping performance. The elastic member 25c suppresses unnecessary vibration of the contact member 23 generated during driving of the vibration wave motor, thereby preventing noise and reduction in output of the vibration wave motor.

Further, elastic deformation of the elastic member 25c mitigates an influence of flatness of the surface of the contact member 23 on which the elastic member 25c is provided. Accordingly, a pressurizing force is uniformly applied from a pressurizing spring 25b to the contact member 23 in the rotating direction, thereby keeping stable contact between the vibrator 22 and the contact member 23.

A shaft 28a includes a bearing mounting portion 28c, an output extraction portion 28i, a hollow inner peripheral portion 28d, a shaft outer periphery fixing portion 28e, and female thread portions 28f. The shaft 28a is a shaft partially having a hollow shape. The bearing mounting portion 28c and the output extraction portion 28i are each formed into a solid shape, whereas a vicinity of the female thread portions 28f is formed into a hollow shape. The output extraction portion 28i is coupled to the member to be driven (not shown) through, for example, a coupling, to thereby cause the member to be driven to make a rotary motion.

The shaft outer periphery fixing portion 28e is brought into abutment against a regulating-member inner peripheral portion 25d of a spring regulating member 25a of a pressurizing member 25. In the second embodiment, the shaft outer periphery fixing portion 28e and the regulating-member inner peripheral portion 25d are formed to have dimensional tolerance in the radial direction so that the shaft outer periphery fixing portion 28e and the regulating-member inner peripheral portion 25d are brought into abutment against each other in a so-called clearance fit relationship.

The two female thread portions 28f are formed with an interval of 60 degrees in the rotating direction of the shaft 28a, and fixing screws (fixing members) 27 are respectively and threadedly engaged with the two female thread portions 28f from the hollow inner peripheral portion 28d of the shaft 28a toward the shaft outer periphery fixing portion 28e. That is, the fixing screws 27 are threadedly engaged from the inner peripheral surface of the hollow portion of the shaft 28a (from the hollow portion side) to the outer peripheral surface thereof. Further, a tip of the fixing member 27 is brought into abutment against the regulating-member inner peripheral portion 25d of the spring regulating member 25a, and the fixing member 27 fixes the spring regulating member 25a at a position of obtaining such a deformation amount of the pressurizing spring 5b as to allow the pressurizing force of the vibration wave motor to have a desired value.

Also in the second embodiment, the fixing member 27 is positioned on the vibrator 22 side with respect to the upper surface of the pressurizing member 25 in FIG. 6 in the axial direction along the center axis L1. That is, the fixing member 27 is positioned in the axial direction between the bottom surface of the vibrator 22 and the upper surface of the pressurizing member 25. Thus, through adoption of the structure in which the fixing member 27 is threadedly engaged from a radially inner portion of the hollow portion of the shaft 28a (from the hollow portion side), reduction in thickness of the vibration wave motor can be realized.

Further, in the second embodiment, there is adopted the structure in which the weight member is not provided and the contact member 23 is directly pressurized through intermediation of the elastic member 25c. Moreover, the fixing member 27 is positioned between the bottom surface of the vibrator 22 and the upper surface of the contact member 23 in the axial direction along the center axis L1. Thus, the vibration wave motor can be further reduced in thickness.

Figure 7A:
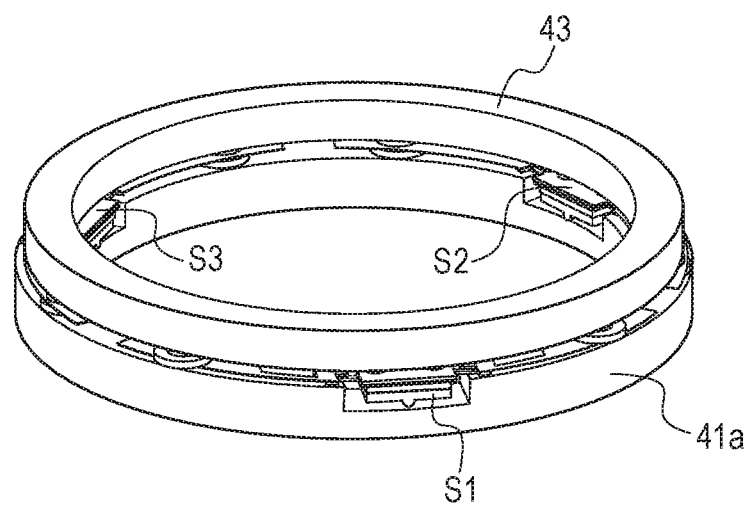
FIG. 7A is a perspective view for illustrating a vibration wave motor according to a modification example of the second embodiment.

In the second embodiment, there is adopted the configuration in which the vibrator 22 is caused to generate the traveling vibration waves to perform driving, but the present disclosure is not limited to this configuration. For example, the vibrator and the contact member may be configured so that a contact member 43 having an annular shape as illustrated in FIG. 7A is driven by three vibrator units S1, S2, and S3 placed on a base member 41a.

Figure 7B:
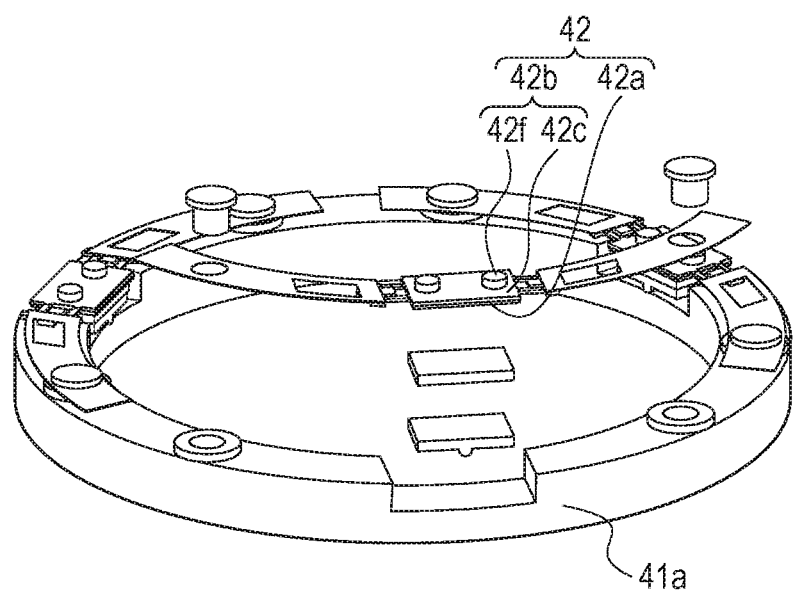
FIG. 7B is an exploded perspective view of FIG. 7A.

FIG. 7B is a perspective view of the vibrator and the contact member, for illustrating a state in which the vibrator unit S1 is disassembled. One vibrator 42 includes an elastic body 42b, two protruding portions 42f, and a piezoelectric element 42a. The two protruding portions 42f are formed on one surface of the elastic body 42b (flat plate portion 42c). The piezoelectric element 42a is provided on a surface of the elastic body 42b opposite to the surface including the protruding portions 42f.

Through use of well-known technology (for example, see Japanese Patent Application Laid-Open No. 2017-70115), vibrations of two vibration modes are excited on the piezoelectric element 42a of the vibrator 42, and the protruding portions 42f are caused to make elliptic motions in a plane including a direction connecting the two protruding portions 42f and a protruding direction of the protruding portions 42f. In this manner, the protruding portions 42f frictionally drive the contact member 43, thereby being capable of rotating the contact member 43 about a center axis of the contact member 43.

When the pressurizing spring rubber and the pressurizing member, which are not shown, are provided on the upper surface of the contact member 43 similarly to the second embodiment, the reduction in thickness of the vibration wave motor can be realized.

Third Embodiment

In a third embodiment, a configuration of an industrial robot is described as one example of an apparatus (machine) including the vibration wave motor according to each embodiment described above.

Figure 8:
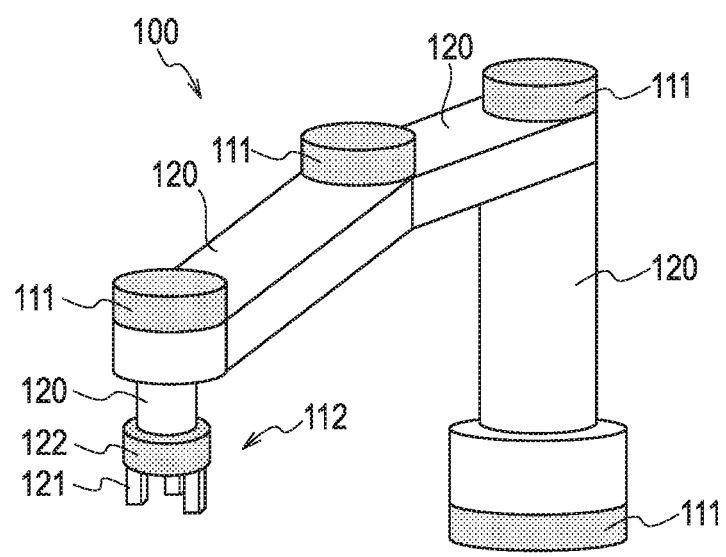
FIG. 8 is a perspective view for illustrating a schematic configuration of a robot to be driven by the vibration motor according to each embodiment of the present disclosure.

FIG. 8 is a perspective view for illustrating the schematic structure of a robot (robot arm) 100 including the vibration wave motors mounted thereto. Here, a horizontal articulated robot as one type of the industrial robot is exemplified. In the robot (robot arm) 100, the vibration wave motor is built in an arm joint unit (first joint member) 111 or a hand unit 112. The first joint member 111 connects two arms so as to be able to change a crossing angle between the two arms (link members) 120.

The hand unit 112 includes the link member 120, a gripping member 121, and a hand joint unit (second joint member) 122. The gripping member 121 is mounted to one end of the link member 120. The hand joint unit 122 connects the link member 120 and the gripping member 121. The vibration wave motor is used in the first joint member 111 configured to change the angle (crossing angle) between the link members 120, or in the second joint member 122 configured to rotate the gripping member 121 (about its axis) by a predetermined angle.

Fourth Embodiment

In a fourth embodiment, a configuration of a pan head apparatus (electronic apparatus) is described as one example of an apparatus including at least two vibration wave motors according to each embodiment described above. The electronic apparatus is not limited to the pan head apparatus, and encompasses every electronic apparatus including a member to be driven and the vibration wave motor according to each embodiment described above as a vibration wave motor configured to drive the member to be driven.

Figure 9A:
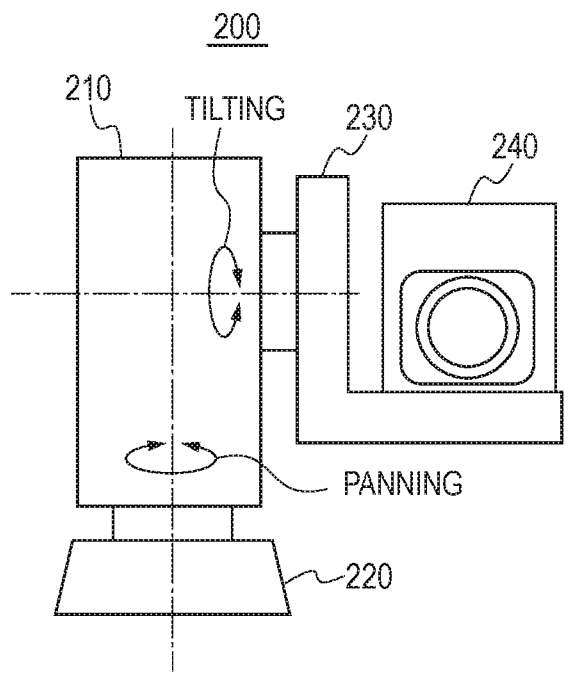
FIG. 9A is a front view for illustrating a schematic configuration of a pan head apparatus to be driven by the vibration motor according to each embodiment of the present disclosure.
Figure 9B:
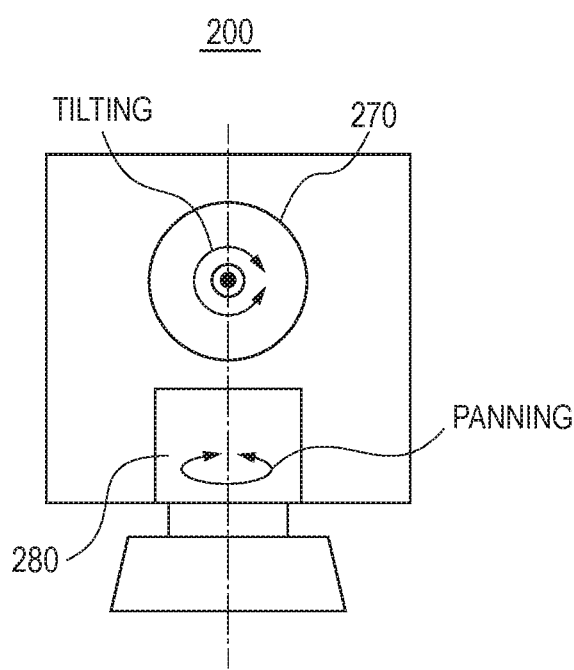
FIG. 9B is a side view of FIG. 9A.
Figure 10:
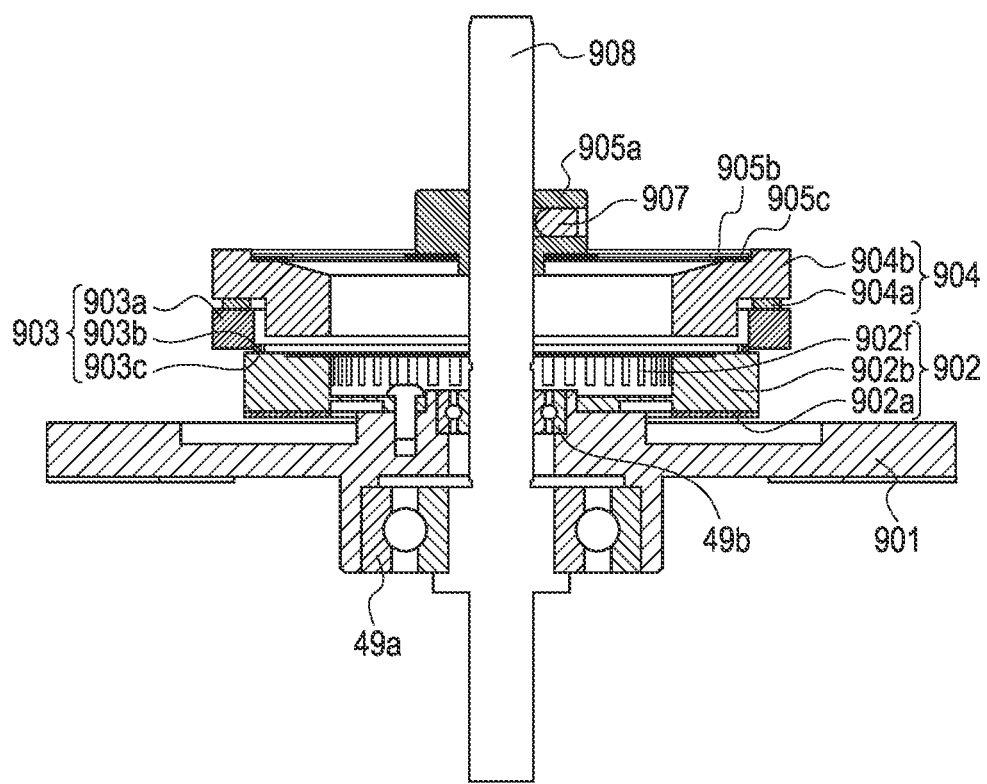
FIG. 10 is a sectional view for illustrating a vibration wave motor of the related art.

FIG. 9A is an external front view for illustrating a pan head apparatus (electronic apparatus) 200. FIG. 9B is a side view for illustrating an interior of the pan head apparatus (electronic apparatus) 200.

The pan head apparatus (electronic apparatus) 200 includes a head unit (support member or member to be driven) 210, a base unit 220, an L-shaped angle bar (support member or member to be driven) 230, and an image pickup apparatus 240.

The two vibration wave motors according to each embodiment described above are arranged inside the head unit (support member or member to be driven) 210.

An output unit of a vibration wave motor 280 for panning is coupled to the base unit 220. Through rotational drive of the vibration wave motor 280, the head unit (support member or member to be driven) 210 is caused to perform panning relatively to the base unit 220. An output unit of a vibration wave motor 270 for tilting is coupled to the L-shaped angle bar (support member) 230. Through rotational drive of the vibration wave motor 270, the L-shaped angle bar (support member) 230 is caused to perform tilting relatively to the head unit (support member or member to be driven) 210. Coupling between the output unit of the vibration wave motor 280 for panning and the base unit 220, and coupling between the output unit of the vibration wave motor 270 for tilting and the L-shaped angle bar (support member) 230 are achieved through fastening with a fixing screw, but the coupling method is not limited thereto. For example, when an external force is less likely to be applied, there may be used another coupling method achieved through fixation such as welding or adhesion.

The image pickup apparatus 240 mounted to the L-shaped angle bar (support member or member to be driven) 230 is a camera for photographing moving images and still images. The image pickup apparatus 240 can perform panning and tilting through drive of the two vibration wave motors while photographing. Further, the vibration wave motor can keep a posture owing to a frictional force even during de-energization. Thus, after a posture of the pan head is determined, the vibration wave motor can be de-energized, and photographing can be continued while suppressing power consumption. In the pan head apparatus (electronic apparatus) 200 according to the fourth embodiment, the image pickup apparatus 240 is mounted to the L-shaped angle bar (support member or member to be driven) 230. However, the component to be mounted is not limited to this configuration, and may be changed as appropriate.

The present disclosure has been described above in detail based on the exemplary embodiments thereof, but the present disclosure is not limited to those particular embodiments, and the present disclosure encompasses various modes without departing from the gist of the present disclosure. Further, the above-mentioned embodiments are each merely one embodiment of the present disclosure, and the respective embodiments can be combined as appropriate.

While the present disclosure has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-225865, filed Nov. 30, 2018, which is hereby incorporated by reference herein in its entirety.

What is claimed is:

1. A vibration wave motor comprising:
a vibrator;
a contact body to be brought into contact with the vibrator;
a shaft fixed to the contact body; and
a fixing member configured to fix the contact body and the shaft from the shaft side,
wherein a part of the contact body is fixed to the shaft at, of a position in a circumferential direction of the shaft and a position in an axial direction of the shaft, both the position in the circumferential direction of the shaft and the position in the axial direction of the shaft, and
wherein another part of the contact body is fixed to the shaft at, of a position in the circumferential direction of the shaft and a position in the axial direction of the shaft, only the position in the circumferential direction of the shaft.

2. The vibration wave motor according to claim 1, wherein the part of the contact body includes a positioning member configured to position the position in the axial direction of the shaft with respect to the shaft, and
wherein the positioning member is received in a first recessed portion, which is formed in the part of the contact body, so as to be brought into contact with a bottom surface of the first recessed portion.

3. The vibration wave motor according to claim 1, wherein the part of the contact body includes a pressurizing member configured to pressurize the other part of the contact body in the axial direction of the shaft so that the other part of the contact body is brought into contact with the vibrator, and
wherein the pressurizing member is received in a second recessed portion, which is formed in the other part of the contact body, so as to be brought into contact with a bottom surface of the second recessed portion.

4. The vibration wave motor according to claim 3, wherein the fixing member fixes the contact body and the shaft on the vibrator side with respect to an end surface of the pressurizing member.

5. The vibration wave motor according to claim 4, wherein the part of the contact body includes an elastic member, and
wherein the pressurizing member is brought into contact with the bottom surface of the second recessed portion through intermediation of the elastic member.

6. The vibration wave motor according to claim 1, wherein through vibration of the vibrator, the contact body is rotated in a circumferential direction of the shaft, and the shaft is rotated about an axis thereof.

7. The vibration wave motor according to claim 1, wherein the shaft includes a hollow portion, and
wherein the fixing member fixes the contact body and the shaft from the hollow portion side.

8. A pan head apparatus comprising:
a support member configured to support an image pickup apparatus; and
a vibration wave motor configured to drive the support member, the vibration wave motor comprising:
a vibrator;
a contact body to be brought into contact with the vibrator;
a shaft fixed to the contact body; and
a fixing member configured to fix the contact body and the shaft from the shaft side,
wherein a part of the contact body is fixed to the shaft at, of a position in a circumferential direction of the shaft and a position in an axial direction of the shaft, both the position in the circumferential direction of the shaft and the position in the axial direction of the shaft, and
wherein another part of the contact body is fixed to the shaft at, of a position in the circumferential direction of the shaft and a position in the axial direction of the shaft, only the position in the circumferential direction of the shaft.

9. An electronic apparatus comprising:
a member to be driven; and
a vibration wave motor configured to drive the member to be driven, the vibration wave motor comprising:
a vibrator;
a contact body to be brought into contact with the vibrator;
a shaft fixed to the contact body; and
a fixing member configured to fix the contact body and the shaft from the shaft side,
wherein a part of the contact body is fixed to the shaft at, of a position in a circumferential direction of the shaft and a position in an axial direction of the shaft, both the position in the circumferential direction of the shaft and the position in the axial direction of the shaft, and
wherein another part of the contact body is fixed to the shaft at, of a position in the circumferential direction of the shaft and a position in the axial direction of the shaft, only the position in the circumferential direction of the shaft.

* * * * *